United States Patent
Link et al.

(10) Patent No.: US 7,725,758 B2
(45) Date of Patent: May 25, 2010

(54) MULTIFUNCTIONAL TIMER/EVENT COUNTER DEVICE AND METHOD OF USING SUCH A DEVICE

(75) Inventors: Jean-François Link, Trets (FR); Dragos Davidescu, Aix en Provence (FR); Sandrine Lendre, Pourrieres (FR)

(73) Assignee: STMicroelectronics SA, Montrouge (FR)

( * ) Notice: Subject to any disclaimer, the term of this patent is extended or adjusted under 35 U.S.C. 154(b) by 607 days.

(21) Appl. No.: 11/641,607

(22) Filed: Dec. 18, 2006

(65) Prior Publication Data

US 2007/0164796 A1 Jul. 19, 2007

(30) Foreign Application Priority Data

Dec. 16, 2005 (FR) .................................. 05 12818

(51) Int. Cl.
 *G06F 1/14* (2006.01)
 *G06F 1/00* (2006.01)
 *G04F 10/00* (2006.01)
(52) U.S. Cl. .................. 713/502; 713/500; 368/108
(58) Field of Classification Search .................. 713/502
See application file for complete search history.

(56) References Cited

U.S. PATENT DOCUMENTS

| | | | |
|---|---|---|---|
| RE29,086 E * | 12/1976 | Murphy et al. ............... | 307/141 |
| 4,720,821 A * | 1/1988 | Ke ............................... | 368/108 |
| 5,042,005 A * | 8/1991 | Miller et al. .................. | 713/502 |
| 5,650,716 A * | 7/1997 | Kim ............................. | 323/282 |
| 5,724,399 A | 3/1998 | Imakura et al. | |
| 5,935,236 A | 8/1999 | Wakimoto et al. | |
| 6,046,965 A * | 4/2000 | Oba ............................. | 368/73 |

FOREIGN PATENT DOCUMENTS

| | | | |
|---|---|---|---|
| EP | 745914 A1 * | 12/1996 | |
| GB | 1323166 A | 7/1973 | |

OTHER PUBLICATIONS

French Search Report, FR0512818, Jul. 12, 2006.

* cited by examiner

*Primary Examiner*—Suresh K Suryawanshi
(74) *Attorney, Agent, or Firm*—Lisa K. Jorgenson; Paul F. Rusyn; Graybeal Jackson LLP

(57) ABSTRACT

A multifunctional timer/event counter device includes at least one counter controlled by a clock signal, and a control register including at least one binary number that will at least define a behavior of the counter. The device also includes a function module including at least one synchronization signal reception input and a reception input for at least one function control signal, the function module being capable of modifying the binary number as a function of at least the synchronization signal and the function control signal.

33 Claims, 4 Drawing Sheets

MULTIFUNCTIONAL TIMER/EVENT COUNTER DEVICE AND METHOD OF USING SUCH A DEVICE

PRIORITY CLAIM

The present application claims the benefit French Patent Application No. FR0512818, filed Dec. 16, 2005, which application is incorporated herein by reference in its entirety.

TECHNICAL FIELD

Embodiments of the invention relate in general to the domain of multifunctional timer/event counter circuits, commonly called "timers" by those skilled in the art.

BACKGROUND

The multifunctional timer/event counter device is a programmable circuit usually including a binary counter associated with a control register and a counter register.

For simplification and clarity reasons, the word "timer" will be used in the remainder of the description to refer to the "multifunctional timer/event counter device".

The control register includes a binary number used to define the behavior of the timer counter. For example, one behavior of the counter may be to activate counting up or counting down on a rising front of a synchronization signal sent on a timer input, initialization of the counter to a value or reinitialization of the counter.

The counter register includes a binary number representative of the state of the counter. For example, this binary number may indicate an overflow to the capacity of the counter, the result of the comparison between the value of the counter and another value, or the value of the counter.

The timer is usually installed in a microcontroller and is used for example in particular to count, measure events or to generate signals with a variable cyclic ratio that can be used as a time base.

For example, the timer can be used to set up time intervals for data transmission. The timer counter is controlled by a clock signal, for example output by an oscillator installed in the microcontroller. The frequency of this clock signal may have been firstly divided by a divider also called a "prescaler" by those skilled in the art.

When the timer is used to count a number of events, it is clocked by signals representative of events to be counted sent to a timer input.

When used as a periodic starter timer, the timer generates constant frequency pulses but with a variable cyclic ratio, more frequently known as PWM (Pulse Width Modulation) to those skilled in the art.

In order to perform these functions, it is sometimes necessary to synchronize two timers, for example arranged on the same microcontroller. A first timer called the master timer is chosen to operate in master mode, and a second timer called the slave timer is chosen to operate in slave mode. In this configuration, the state of the master timer counter can be used to control the behavior of the slave timer counter.

For this purpose, some timers according to the prior art include specific inputs predefined and fixed by the manufacturer. These specific inputs may for example be an external clock input, a start counter input, an initialize counter input, an input for capture of the counter value in a register, etc.

However, the architecture of internal connections in each timer is physically fixed by the manufacturer. Thus, a signal sent to the start counter input will have the sole function of starting the counter, and can under no circumstances be used for example to initialize the counter or to give the order to capture the value of the counter in a register. Therefore, two signals have to be used to control starting and initializing the counter.

Since the architecture of existing microcontrollers is also physically fixed by the manufacturer, it is usually impossible to choose the signal generated by the master timer to control starting the slave timer. For example, the slave timer counter cannot be started until after an overflow of the master timer counter.

Similarly, if it is required to control the slave timer clock with a signal external to the micro controller, and then a signal with an output from the master timer, it is necessary to use two clock inputs on the slave timer or to make additional wiring on the input side of the slave timer.

SUMMARY

In this context, one embodiment of the invention is a multifunctional timer/event counter device unaffected by at least one of the limitations mentioned above.

According to one embodiment of the present invention, a multifunctional timer/event counter device includes a function module including at least a synchronization signal reception input and a reception input for at least a function control signal, the function module being capable of modifying the binary number as a function of at least the synchronization signal and the function control signal.

Thus, due to this arrangement, the device offers flexibility of how the synchronization signal reception input is used. For example, the input is no longer limited only to starting the counter of the device, and the function control can be used to assign a role to the synchronization signal, during the same process. Thus, a single synchronization signal can be used for example to start the counter, to initialize the counter, to capture the value of the counter, to stop the counter depending on the state of the synchronization signal, to control the count direction of the counter, namely to count up or to count down.

In one embodiment of the invention, the device also includes a first selection module including at least one plurality of inputs, and a reception input of a first selection control signal. This first selection module can be used to connect one input among the plurality of inputs of the first selection module, to the synchronization signal reception input of the function module, according to the first selection control signal.

The addition of this first selection module enables the device to receive signals with different frequencies, for example. Thus, two signals may for example be used to control starting of the counter. Therefore each behavior of the counter is no longer related only to one input of the first selection module.

For example, the device could also be made to comprise a second selection module including at least a synchronization output, a plurality of reception inputs of signals representative, at least for some of the signals at least a state of the counter, and signals defining, at least for some, at least the behavior of the counter, and a reception input for at least a second selection control signal. This second selection module can be used to connect one input among the plurality of inputs of the second selection module to the synchronization output according to the second selection control signal.

Advantageously, the device also includes a timer means capable of generating a signal defining at least the behavior of the counter based on the binary number and an event of the clock signal.

This timer means may for example be a D type flip-flop active on the rising front of the clock signal.

The device may also include at least one first means of activating the function module.

The device may also include at least one second means of activating the first selection module.

A multifunctional timer/event counter device like that described above may be included in a microcontroller.

The synchronization signal may be internal or external to the microcontroller.

An embodiment of the invention also relates to a method of using a multifunctional timer/event counter device including at least a counter controlled by a clock signal, and a control register including at least a binary number that will at least define a behavior of the counter. According to a first operating mode and during at least a first clock cycle, a function module executes the steps of reception of a synchronization signal, reception of a function control signal, and modification of the binary number according to the synchronization signal and the function control signal.

According to the first operating mode and during at least the first clock cycle, a first selection module may execute the steps of reception of a plurality of synchronization signals, reception of a first selection control signal, selection of the synchronization signal among the plurality of synchronization signals, according to the first selection control signal, and sending the synchronization signal to the function module.

According to a second operating mode and during at least the first clock cycle, a second selection module may execute the steps of reception of a plurality of signals, representative, at least for some, of a state of the counter, and a plurality of signals defining, at least for some, the behavior of the counter, reception of a second selection control signal, selection of a signal among the plurality of signals, according to the second selection control signal, and send the selected signal to a synchronization output of the second selection module.

During at least a second clock cycle and starting from an event of the clock signal, the counter may execute the behavior defined by the binary number.

The method may also include a step to activate the first operating mode.

The method may also include a step to activate the second operating mode.

According to another embodiment of the invention, the synchronization signal is a signal representative of at least a state of a counter of a second multifunctional timer/event counter device or a signal defining at least a behavior of the counter of the second device.

The plurality of synchronization signals may include at least a signal representative of at least a state of a counter of a second multifunctional timer/event counter device or a signal defining at least a behavior of the counter of the second device.

During at least a second clock cycle and starting from an event of the clock signal, the counter of the first device executes the behavior defined by the first binary number, and the counter of the second device executes a behavior defined by a second binary number contained in a control register of the second device.

The method may include a step to activate the first operating mode.

The method may also include a step to activate the second operating mode.

A function module of the second device may receive a signal representative of the state of the counter of the first device or a signal defining the behavior of the counter of the first device.

A first selection module of the second device may receive a signal representative of a state of the counter of the first device or a signal defining the behavior of the counter of the first device.

BRIEF DESCRIPTION OF THE DRAWINGS

Other characteristics and advantages of the invention will become clearer from the following description of a preferred embodiment of the invention given below for guidance and that is in no way limiting, with reference to the appended figures, wherein.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
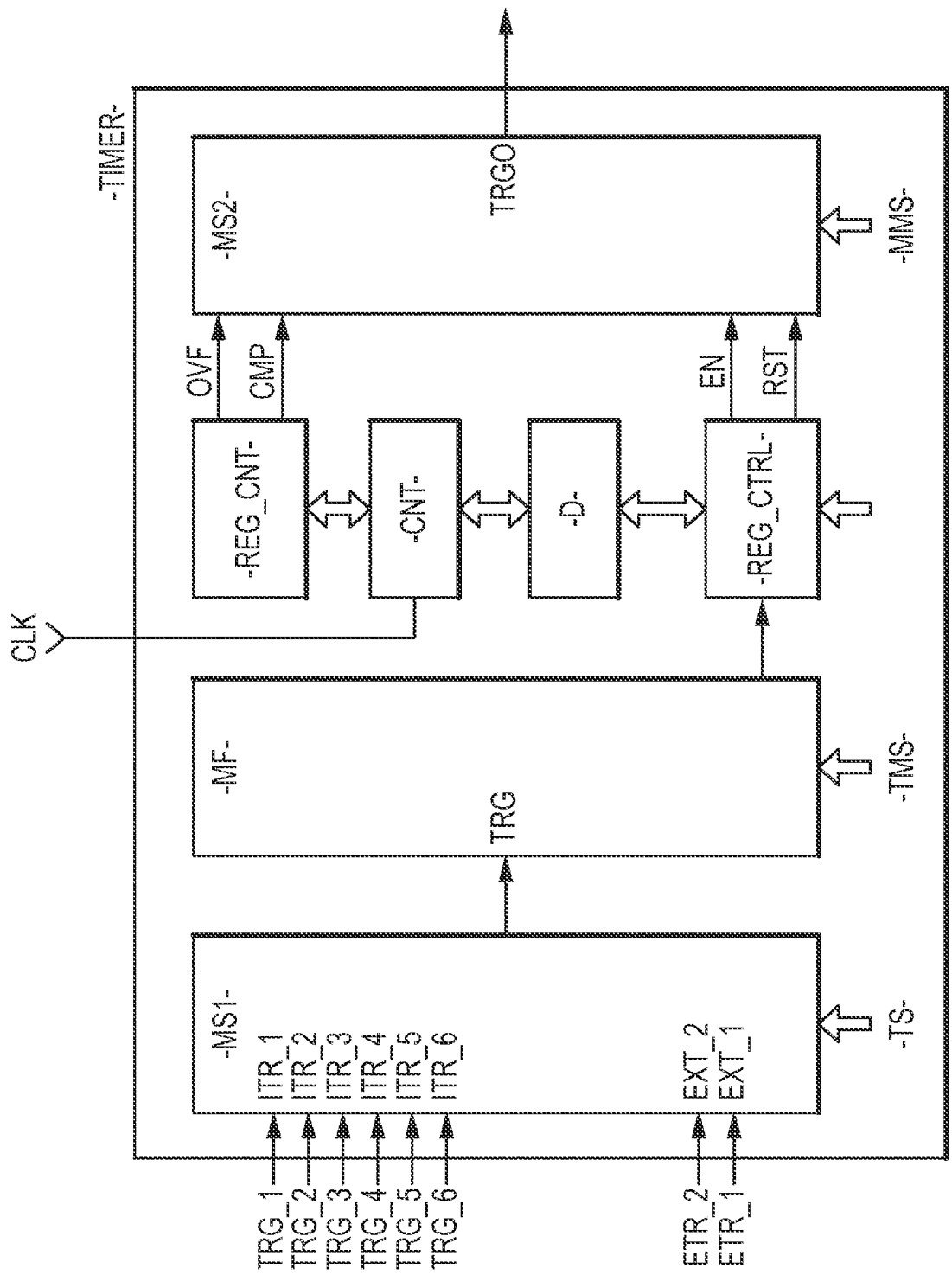
FIG. 1 shows a timer/event counter device according to one embodiment of the invention in the form of a block diagram.

FIG. 1 shows a timer/event counter device in the form of a block diagram according to a particular embodiment of the invention.

The multifunctional timer/event counter device (TIMER), for example placed on a microcontroller chip, comprises a counter (CNT) controlled by a clock signal (CLK), a control register (REG_CTRL) including a binary number that will define a behavior of the counter (CNT) and a counter register (REG_CNT) containing a binary number representative of the state of the counter. This device (TIMER) also includes a function module (MF), a first and a second selection module (MS1, MS2) and a timer means (D).

The function module (MF) includes a reception input (TRG) for a logical synchronization signal and a reception input for at least one function control signal (TMS), and is capable of modifying the binary number taking account of the synchronization signal and the function control signal (TMS).

The function control signal (TMS) may for example consist of a set of function control bits defined for example as follows:

000: reinitialize the counter on a rising front of the synchronization signal;

001: counter clocked by the synchronization signal;

010: start the counter when the synchronization signal is at the high level, and stop the counter when the synchronization signal is at the low level;

011: start the counter on a rising front of the synchronization signal, with no control over stopping the counter;

100: count down by the counter when the synchronization signal is at high level and count up when the synchronization signal is at the low level;

and a set of activation bits of the function module (MF) defined as follows:
0: the function module (MF) is deactivated;
1: the function module (MF) is active and the behavior of the counter is controlled by the synchronization signal.

For example, function control bits and activation bits of the function module (MF) may be sent to the function module (MF) by programming.

Thus, when activation bits 1 and function control bits 000 are sent to the function module (MF), the function module modifies the binary number contained in the control register (REG_CTRL) taking account of the synchronization signal, so that the counter (CNT) is reinitialized on a rising front of this synchronization signal.

By sending the same synchronization signal and the function control bits 011 to the function module (MF), the function module once again modifies the binary number contained in the control register (REG_CTRL) according to the state of the synchronization signal so that the counter starts on a rising front of the synchronization signal.

The first selection module (MS1) includes a plurality of inputs and a reception input of a first selection control signal (TS). This first selection module (MS1) can connect one input chosen from among the plurality of inputs to this first selection module (MS1), to the reception input (TRG) of a synchronization signal of the function module (MF) as a function of the first selection control signal (TS).

The plurality of inputs of the first selection module (MS1) may for example consist of eight inputs (ITR_1, ITR_2, ITR_3, ITR_4, ITR_5, ITR_6, EXT_11, EXT_2), the first six inputs provided to receive six signals internal to the micro controller and the remaining two inputs being provided to receive two signals external to the microcontroller.

For example, the first selection control signal (TS) may consist of a first set of selection control bits, for example defined as follows:
000: selection of the first input (ITR_1);
001: selection of the second input (ITR_2);
010: selection of the third input (ITR_3);
011: selection of the fourth input (ITR_4);
100: selection of the fifth input (ITR_5);
101: selection of the sixth input (ITR_6);
110: selection of the seventh input (EXT_1);
111: selection of the eighth input (EXT_2);

For example, the selection control bits may be sent to the first selection module (MF) by programming.

The second selection module (MS2) comprises a synchronization output (TRGO), several inputs for reception of signals representative of the states of the counter (CNT) and signals defining behaviors of the counter (CNT), and a reception input for at least a second selection control signal (MMS).

This second selection module (MS2) can connect one input from among the plurality of inputs of this second selection module (MS2), to the synchronization output (TRGO) according to the second selection control signal (MMS).

For example, the plurality of inputs receives an overflow signal (OVF) from the counter (CNT), a comparison signal (CMP) representative of the result of the comparison between the value of the counter (CNT) and another value recorded in the counter register (REG_CNT), a start signal (EN) of the counter and a reset counter signal (RST).

The second selection control signal (MMS) may for example consists of a second set of selection control bits, for example defined as follows:
000: activate the second selection module (MMS);
001: send the reset signal (RST) to the synchronization output (TRGO);
010: send the start signal (EN) from the counter to the synchronization output (TRGO);
011: send the overflow signal (OVF) to the synchronization output (TRGO);
100 send the comparison signal (CMP) to the synchronization output (TRGO);

The second set of selection control bits may for example be sent to the second selection module (MS2) by programming.

For example, the timeout means (D) may consist of a set of flip-flops, known to those skilled in the art, controlled by the clock signal (CLK) and active on a rising front of the clock signal (CLK).

If the binary number in the control register (REF_CTRL) is modified during a first clock cycle so that the counter (CNT) adopts a new behavior, for example to start counting, the counter (CNT) will not follow this new behavior until the next clock cycle.

The device can operate in two different operating modes (MASTER, SLAVE):
the first operating mode (SLAVE) is activated by sending the second set of selection control bits 000 to the second selection module (MS2), and
the second operating mode (MASTER) is activated by sending activation bits 1 to the function module (MF).

Figure 2:
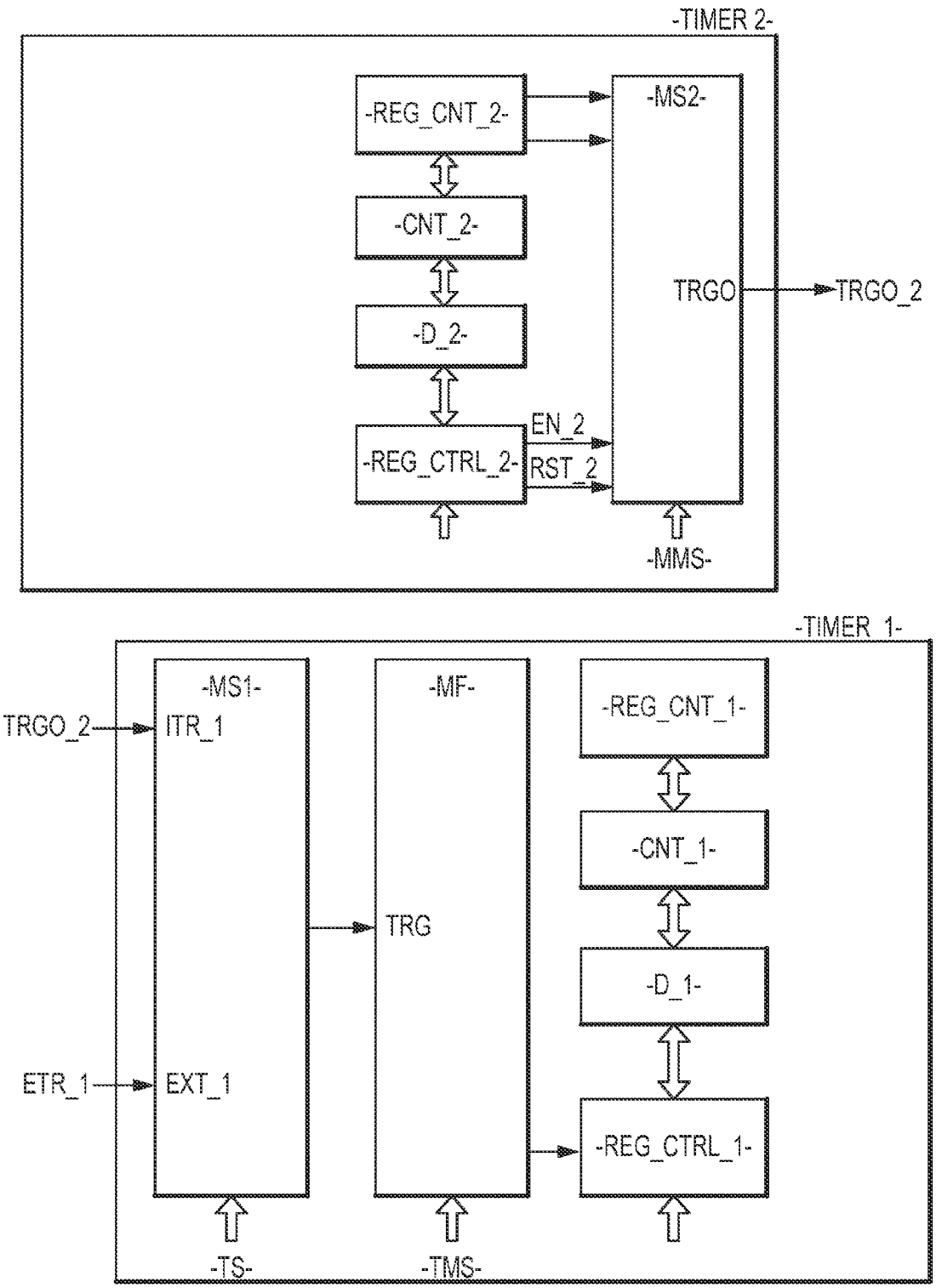
FIG. 2 shows two timer/event counter devices in a particular application in the form of a block diagram, one device being used in a first operating mode, and the other device being used in a second operating mode.

FIG. 2 contains a block diagram showing two timer/event counter devices (TIMER_1, TIMER_2) in a particular application, the first device (TIMER_1) operating according to the first operating mode (SLAVE), and the second device (TIMER_2) acting according to the second operating mode (MASTER).

For reasons of clarity, only elements necessary for understanding the first operating mode (SLAVE) are shown on the first device, and only the elements necessary for understanding the second operating mode (MASTER) are shown on the second device.

Similarly, for clarity and simplification reasons, we will call:
the first counter (CNT_1), the counter for the first device (TIMER_1) and the second counter (CNT_2), the counter for the second device (TIMER_2);
the first counter register (REG_CNT_1) is the counter register for the first device (TIMER_1) and the second counter register (REG_CNT_2) is the counter register for the second device (TIMER_2);
the first timer means (D_1) is the timer means for the first device (TIMER_1) and the second timer means (D_2) is the timer means for the second device (TIMER_2);
the first control register (REG_CTRL_1) is the control register for the first device (TIMER_1) and the second control register (REG_CTRL_2) is the control register for the second device (TIMER_2);

In this particular application, the synchronization output (TRGO) from the second device (TIMER_2) is connected to the first input (ITR_1) of the first selection module (MS1) of the first device (TIMER_1). For example, this configuration is used for starting the counters of the two devices (TIMER_1, TIMER_2) during the same clock cycle.

To do this, simply:
send the selection control signal (MMS) to the second selection module (MS2) of the second device (TIMER_2), containing the second set of selection control bits defined by bits 010, in order to send the start signal (EN) for the second counter (CNT_2) to the synchronization output (TRGO) of the second device (TIMER_2);

send the first selection control signal (TS) for the first selection module (MS1) of the first device (TIMER_1), containing the first set of selection control bits defined by bits 000, so as to connect the first input (ITR_1) of the first selection module (MS1) to the reception input (TRG) of a synchronization signal of the function module (MF) of the second device (TIMER_2);

send the function control signal (TMS) to the function module (MF) of the second device (TIMER_2) containing activation bits 1 and function control bits 011.

With the synchronization output (TRGO) connected to the first input of the first selection module (MS1) of the first device (TIMER_1), the start signal (EN) will also be used to start the first counter (CNT_1).

Therefore, this start signal is the synchronization signal for the two devices (TIMER_1, TIMER_2).

Modification of the binary number contained in the second control register (REG_CTRL_2) by direct programming, provides a means of starting the first and second counters (CNT_1, CNT_2) during the same clock cycle.

Figure 3:
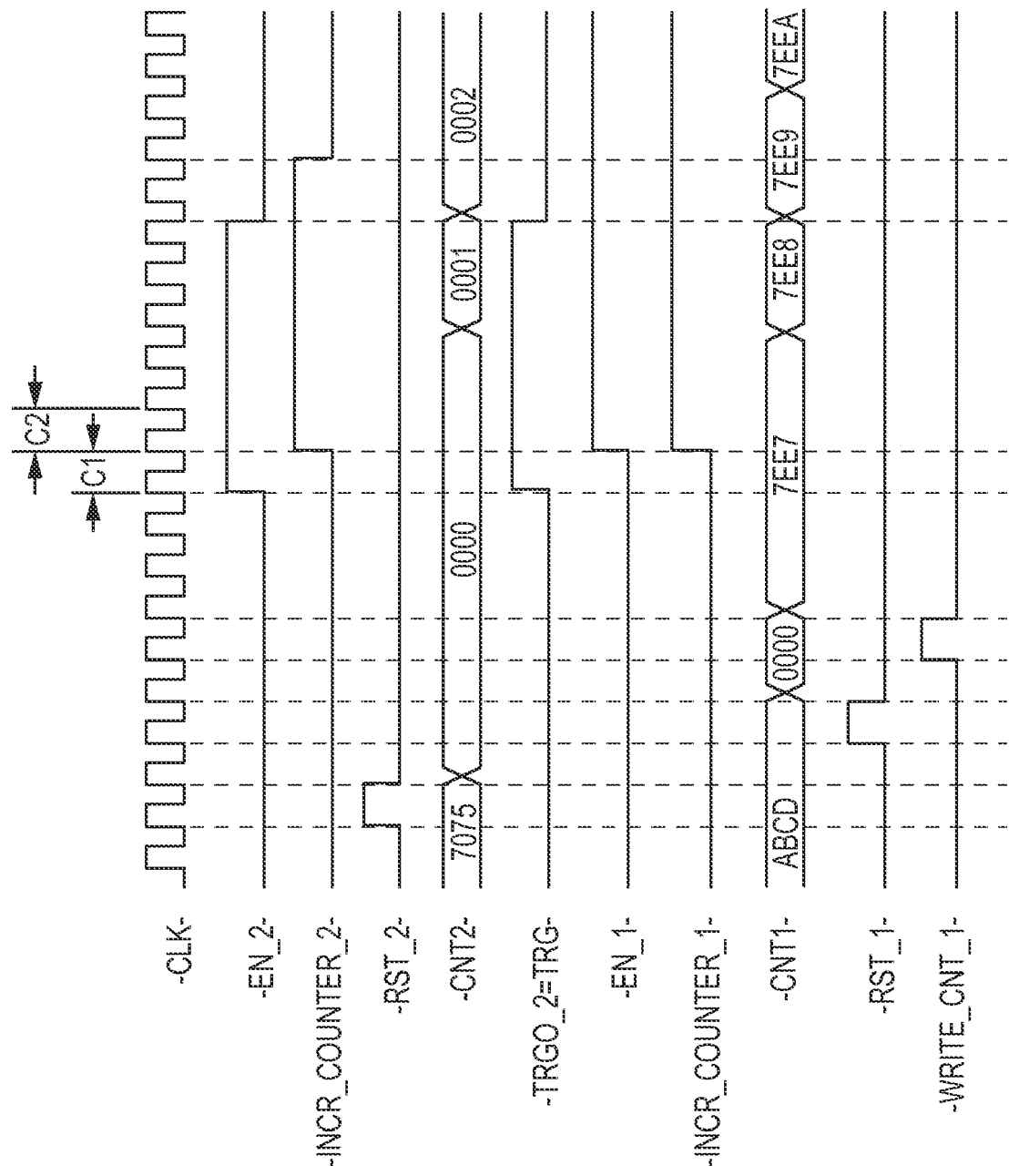
FIG. 3 shows a timing diagram for the signals from the devices in the embodiment of FIG. 2.

FIG. 3 shows a timing diagram of signals illustrating the operation of devices in this particular application.

CLK is the clock signal controlling the counters.

RST_1 and RST_2 are the reset first counter (CNT_1) signal and the reset second counter CNT_2) signal, respectively.

EN_1 and EN_2 represent the start first counter signal (CNT_1) and the start second counter signal CNT_2) respectively, sent to the first control register (REG_CTRL_1) and to the second control register (REG_CTRL_2) respectively.

CNT1 and CNT2 represent the value of the first counter (CNT_1) and the value of the counter of the second device (TIMER_2) respectively.

INCR_COUNTER_1 and INCR_COUNTER_2 represent the signal giving the start count order for the first counter (CNT_1) and the signal giving the start count order for the second counter CNT_2) respectively, generated by the first timer means (D_1) and the second timer means (D_2) respectively.

TRGO_2 represents the signal at the synchronization output from the second selection module (MS2) of the second device (TIMER_2).

WRITE_CNT_1 represents the signal setting the value of the first counter (CNT_1).

Firstly, the second counter CNT_2) is reset to zero when RST_2 is at the high level.

Similarly, the first counter (CNT_1) is reset to zero when RST_1 is at the high level.

The first counter (CNT_1) is then initialized with the value 32487, namely 7EE7 in hexadecimal notation, when WRITE_CNT_1 is at the high level.

During at least one first clock cycle (C1), EN_2 is set to the high level and is sent through the second control register (REG_CTRL_2) to the second timeout means (D_2) controlled by the same clock signal (CLK).

During this same clock cycle (C1), EN_2 is sent to the synchronization output (TRGO) from the second device (TIMER_2)

This synchronization output (TRGO) being connected to the first input (ITR_1) of the first selection module (MS1) of the first device (TIMER_1), EN_2 is sent to the reception input (TRG) as a synchronization signal of the function module (MF) of the first device (TIMER_1).

Also during this same first clock cycle (C1), the binary number of the first control register (REG_CTRL_1) is then modified. The first timer means (D_1) controlled by the same clock signal (CLK) receives the signal EN_2.

During a second clock cycle (C2) and on a rising front of the clock signal (CLK), the first timer means (D_1) and the second timer means (D_2) generate the INCR_COUNTER_1 and INCR_COUNTER_2 signals respectively, identical to the EN_2 signal. During this same second clock cycle (C2), these INCR_COUNTER_1 and INCR_COUNTER_2 signals are sent to the first counter (CNT_1) and the second counter (CNT_2) respectively. Thus, the first and second counters are started during this second clock cycle (C2).

For example, synchronization of the two devices (TIMER_1, TIMER_2) enables the two counters to be set to the initial values, and the comparison values in the registers can be configured to build up two PWM type logical signals with different frequencies but with an integer ratio, or two PWM type logical signals with identical frequencies but different phases.

It is also possible to loop back the synchronization output (TRGO) from the function module (MF) of the first device (TIMER_1) onto an input of the first selection module (MS1) of the second device (TIMER_2).

Thus, during the same process, each device can operate according to the first operating mode (SLAVE), then according to the second operating mode (MASTER).

Embodiments of the invention can also limit the number of connections between several devices, and enables flexible configuration of the devices.

Figure 4:
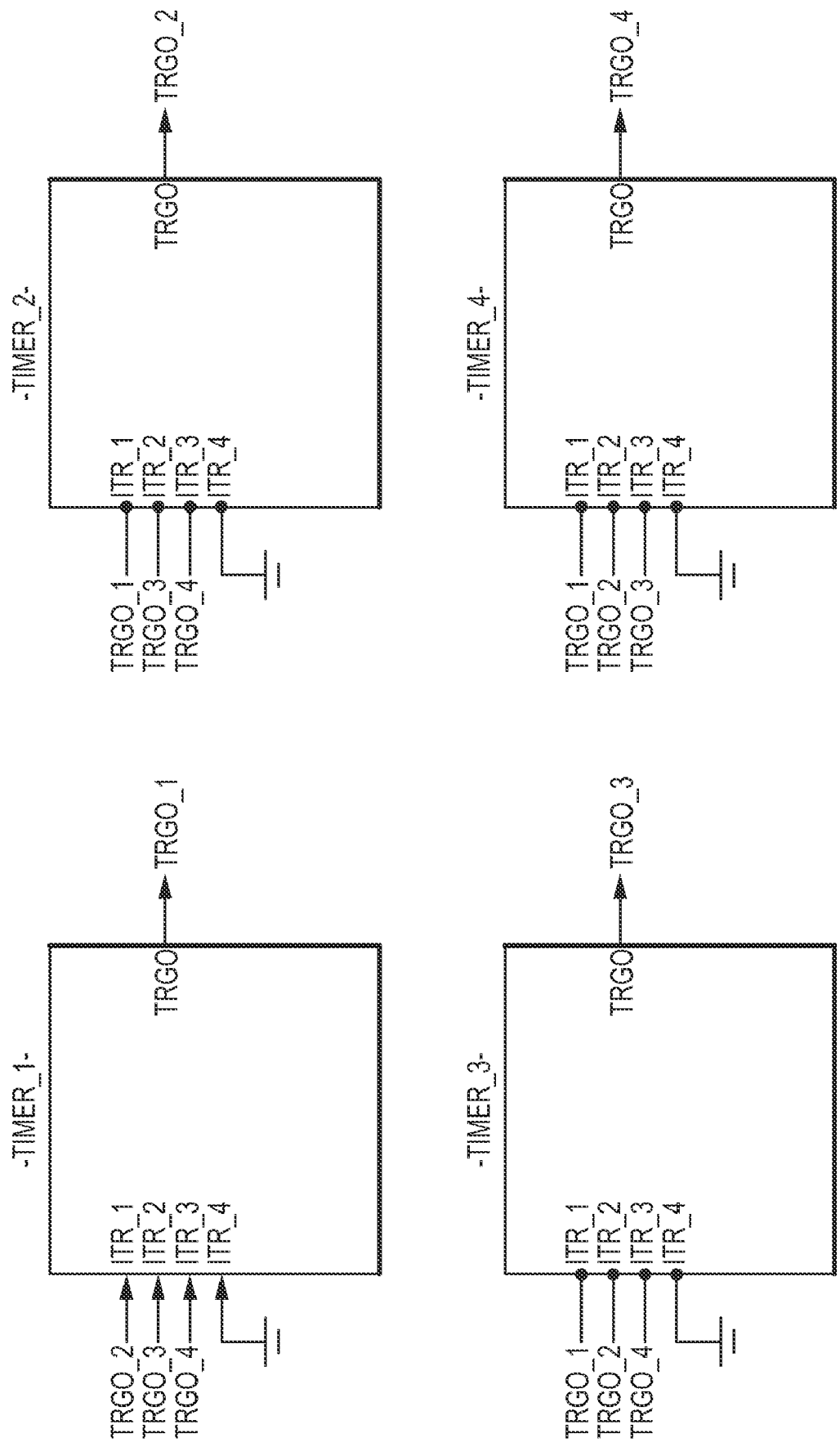
FIG. 4 shows four devices according to another embodiment of the invention arranged to form a network.

It is thus possible to make a network of timers as shown in FIG. 4, each device can control the other devices and can be controlled by the other devices. Thus, it is possible to build up very large frequency dividers from this type of configuration.

The timer and networks of timers may be contained in microcontrollers and other types of electronic circuits as well. Such a microcontroller or other type of electric circuit may, in turn, be contained in many different types of electronic systems, such as embedded systems designed to perform a particular function and computer systems generally.

From the foregoing it will be appreciated that, although specific embodiments of the invention have been described herein for purposes of illustration, various modifications may be made without deviating from the spirit and scope of the invention.

The invention claimed is:

1. A multifunctional timer/event counter device, comprising:
   a counter controlled by a clock signal;
   a counter register including a binary number representative of a state of said counter; and
   a control register comprising at least a binary number that will define a behavior of said counter,
   wherein the multifunctional timer/event counter device also includes a function module including a synchronization signal reception input and a reception input for at least one function control signal, said function module being capable of modifying said binary number in the control register as a function of at least said synchronization signal and said function control signal, the synchronization signal being used to clock or start the counter.

2. The multifunctional timer/event counter device according to claim 1, further comprising a first selection module including:
   a plurality of inputs; and
   a reception input of a first selection control signal,
   said first selection module being configured to connect one input among said plurality of inputs of said first selection module, to said synchronization signal reception input of said function module, according to said first selection control signal.

3. A multifunctional timer/event counter device, comprising:
   a counter controlled by a clock signal;
   a counter register including a binary number representative of a state of said counter; and
   a control register comprising at least a binary number that will define a behavior of said counter,
   wherein the multifunctional timer/event counter device also includes a function module including a synchronization signal reception input and a reception input for at least one function control signal, said function module being capable of modifying said binary number in the control register as a function of at least said synchronization signal and said function control signal, the synchronization signal being used to clock or start the counter;
   wherein the multifunctional timer/event counter device further comprises a first selection module including:
      a plurality of inputs; and
      a reception input of a first selection control signal,
      said first selection module being configured to connect one input among said plurality of inputs of said first selection module, to said synchronization signal reception input of said function module, according to said first selection control signal; and
   wherein the multifunctional timer/event counter device further comprises a second selection module including:
      a synchronization output; and
      a plurality of reception inputs of signals representative, at least for some, of at least one state of said counter, and signals defining, at least for some, at least said behavior of said counter; and- a reception input for at least a second selection control signal,
      said second selection module being capable of connecting an input among said plurality of inputs of said second selection module to said synchronization output according to said second selection control signal.

4. The multifunctional timer/event counter device according to claim 1, further comprising a timer means capable of generating a signal defining at least said behavior of said counter based on said binary number and an event of said clock signal.

5. The multifunctional timer/event counter device according to claim 1, further comprising at least a first means of activating said function module.

6. The multifunctional timer/event counter device according to claim 1, further comprising at least a second means of activating said first selection module.

7. A microcontroller including a multifunctional timer/event counter device, the multifunctional timer/event counter device comprising:
   a counter controlled by a clock signal;
   a counter register including a binary number representative of a state of said counter; and
   a control register comprising at least a binary number that will define a behavior of said counter,
   wherein the multifunctional timer/event counter device also includes a function module including a synchronization signal reception input and a reception input for at least one function control signal, said function module being capable of modifying said binary number in the control register as a function of at least said synchronization signal and said function control signal, the synchronization signal being used to clock or start the counter according to claim 1.

8. The microcontroller according to claim 7, in which said synchronization signal is internal or external to said microcontroller.

9. A method for implementing a first multifunctional timer/event counter device, comprising:
   a counter controlled by a clock signal;
   a counter register including a binary number that will define a state of said counter; and
   a control register including at least one binary number that will at least define a behavior of said counter;
   wherein according to a first operating mode and during at least a first clock cycle, a function module executes the following steps:
   reception of a synchronization signal;
   reception of a function control signal ; and
   modification of said binary number in the control register according to said synchronization signal and said function control signal, the synchronization signal being used to clock or start the counter.

10. The method according to claim 9, in which, according to said first operating mode and during at least said first clock cycle, a first selection module executes the following steps:
   reception of a plurality of synchronization signals;
   reception of a first selection control signal;
   selection of said synchronization signal from among said plurality of synchronization signals, according to said first selection control signal; and
   send said synchronization signal to said function module.

11. The method according to claim 9, in which, according to a second operating mode and during at least said first clock cycle, a second selection module executes the steps:
   reception of a plurality of signals representative, at least for some, of a state of said counter, and a plurality of signals defining at least for some, said behavior of said counter;
   reception of a second selection control signal;
   selection of a signal from among said plurality of signals, according to said second selection control signal; and
   sending said selected signal to a synchronization output of said second selection module.

12. The method according to claim 9, in which, during at least a second clock cycle and starting from an event of said clock signal, said counter executes said behavior defined by said binary number.

13. The method according to claim 9, including a step to activate said first operating mode.

14. The method according to claim 9, including a step to activate said second operating mode.

15. The method according to claim 9, in which said synchronization signal is a signal representative of at least a state of a counter of a second multifunctional timer/event counter device or a signal defining at least one behavior of said counter of said second device.

16. The method according to claim 10, in which said plurality of synchronization signals includes at least a signal representative of at least a state of a counter of a second multifunctional timer/event counter device or a signal defining at least a behavior of said counter of said second device.

17. The method according to claim 15, in which during at least a second clock cycle and starting from an event of said clock signal, said counter of said first device executes said behavior defined by said first binary number, and said counter of said second multifunctional timer/event counter device executes a behavior defined by a second binary number contained in a control register of said second device.

18. The method according to claim 15, including a step to activate said first operating mode.

19. The method according to claim 15, also including a step to activate said second operating mode.

20. The method according to claim 15, in which a function module of said second multifunctional timer/event counter device receives a signal representative of said state of said counter of said first multifunctional timer/event counter device or a signal defining said behavior of said counter of said first device.

21. The method according to claim 15, in which a first selection module of said second multifunctional timer/event counter device receives a signal representative of a state of said counter of said first multifunctional timer/event counter device or a signal defining said behavior of said counter of said first device.

22. A multifunctional timer, comprising:
    a counter configured to receive a clock signal;
    a counter register coupled to the counter;
    a control register coupled to the counter, the control register operable to store values that define the operation of the counter; and
    a function module coupled to the control register and configured to receive a synchronization signal and a function control signal, the function module operable responsive to the synchronization and function control signals to modify values stored in the control register to control the operation of the counter and further operable to start the counter responsive to the synchronization signal.

23. The multifunction timer of claim 22, wherein the timer further comprises a first selection module coupled to the function module, the first selection module adapted to receive a plurality of received synchronization signals and adapted to receive a first selection control signal, the first selection module operable responsive to the first selection control signal to output one of the received synchronization signals as the synchronization signal to the function module.

24. The multifunction timer of claim 23, further comprising a second selection module coupled to the counter register to receive signals indicative of the state of the counter and coupled to the control registers to receive signals indicative of the operation of the counter, and the second selection module adapted to receive a second selection control signal, the second selection module operable responsive to the second selection control signal to provide on an output a synchronization signal corresponding to one of the signals received from the counter and control registers.

25. A network of multifunctional timers, comprising:
    a plurality of multifunctional timers, each timer including,
        a counter configured to receive a clock signal;
        a counter register coupled to the counter;
        a control register coupled to the counter, the control register operable to store values that define the operation of the counter;
        a function module coupled to the control register and configured to receive a synchronization signal and a function control signal, the function module operable responsive to the synchronization and function control signals to modify values stored in the control register to control the operation of the counter and further operable to start the counter responsive to the synchronization signal;
        a first selection module coupled to the function module, the first selection module adapted to receive a plurality of received synchronization signals and adapted to receive a first selection control signal, the first selection module operable responsive to the first selection control signal to output one of the received synchronization signals as the synchronization signal to the function module; and
        a second selection module coupled to the counter register to receive signals indicative of the state of the counter and coupled to the control registers to receive signals indicative of the operation of the counter, and the second selection module adapted to receive a second selection control signal, the second selection module operable responsive to the second selection control signal to provide on an output a synchronization signal corresponding to one of the signals received from the counter and control registers; and
    wherein the plurality of timers are interconnected by coupling the outputs from the second selection modules contained in at least some of the timers to the first selection modules contained in other ones of the timers.

26. The network of timers of claim 25, wherein the network is operable to function as a frequency divider.

27. The network of timers of claim 25, wherein the network comprises two timers and wherein the two timers generate respective synchronization signals from their respective second selection modules, the two synchronization signals corresponding with to: 1) two PWM signals having first and second frequencies, the first frequency being an integer multiple of the second frequency; or 2) two PWM signals having the same frequency but different phases.

28. An electronic system, comprising:
    electronic circuitry including at least one multifunctional timer, each timer including,
        a counter configured to receive a clock signal;
        a counter register coupled to the counter;
        a control register coupled to the counter, the control register operable to store values that define the operation of the counter;
        a function module coupled to the control register and configured to receive a synchronization signal and a function control signal, the function module operable responsive to the synchronization and function control signals to modify values stored in the control register to control the operation of the counter and further operable to start the counter responsive to the synchronization signal;
        a first selection module coupled to the function module, the first selection module adapted to receive a plurality of received synchronization signals and adapted to receive a first selection control signal, the first selection module operable responsive to the first selection control signal to output one of the received synchronization signals as the synchronization signal to the function module; and
        a second selection module coupled to the counter register to receive signals indicative of the state of the counter and coupled to the control registers to receive signals indicative of the operation of the counter, and the second selection module adapted to receive a second selection control signal, the second selection module operable responsive to the second selection control signal to provide on an output a synchronization signal corresponding to one of the signals received from the counter and control registers; and
        wherein the plurality of timers are interconnected by coupling the outputs from the second selection modules contained in at least some of the timers to the first selection modules contained in other ones of the timers.

29. The electronic system of claim 28, wherein the electronic circuitry comprises one of an embedded system and a computer system.

30. A method of performing timing functions, the method comprising:
receiving a plurality of first synchronization signals;
selecting one of the first synchronization signals responsive to a first selection signal;
receiving a function control signal;
responsive to the function control signal and the selected one of the first synchronization signals, setting a plurality of control values signals;
storing the plurality of control value signals;
initiating a count responsive to the synchronization signal, the count having characteristics determined by the control value signals;
generating state signals indicative of the state of the count;
storing the state signals;
receiving a second selection control signal;
responsive to the second selection control signal, selecting one of the stored control value signals and state signals; and
providing the selected control value or state signal as a synchronization signal.

31. The method of claim 30, wherein the method further comprises performing the operations set forth N times in parallel and providing the synchronization signal provided by given ones of these parallel processes to other ones of the parallel processes.

32. The method of claim 30, wherein the first synchronization signals comprise either internal microcontroller signals or external microcontroller signals.

33. The method of claim 30, wherein the generated state signals include a count value and wherein the count value is generated responsive to a fixed frequency clock signal.

* * * * *

UNITED STATES PATENT AND TRADEMARK OFFICE
CERTIFICATE OF CORRECTION

PATENT NO.         : 7,725,758 B2
APPLICATION NO.    : 11/641607
DATED              : May 25, 2010
INVENTOR(S)        : Jean-Francois Link et al.

Page 1 of 1

It is certified that error appears in the above-identified patent and that said Letters Patent is hereby corrected as shown below:

- In Paragraph 1, Column 1, Line 7 of the patent, "claims the benefit French Patent" should read --claims the benefit of French Patent--.

- In Claim 3, Column 9, Line 35 of the patent, "- a reception input for at" should be deleted.

- In Claim 3, Line 9, Line 36 of the patent, "least a second selection control signal," should read --and a reception input for at least a second selection control signal,--.

- In Claim 9, Column 10, Line 17 of the patent, "function control signal ; and" should read --function control signal; and--.

Signed and Sealed this
Eighteenth Day of January, 2011

David J. Kappos
*Director of the United States Patent and Trademark Office*